C. H. CHADBOURN.
WIRE-BAND CUTTING IMPLEMENT.

No. 190,467. Patented May 8, 1877.

Witnesses:
T. H. McConnell
N. Bliss

Inventor:
Chas. H. Chadbourn

UNITED STATES PATENT OFFICE.

CHARLES H. CHADBOURN, OF ROCHESTER, MINNESOTA, ASSIGNOR, BY MESNE ASSIGNMENTS, TO HIMSELF AND JAMES M. WILLIAMS, OF SAME PLACE.

IMPROVEMENT IN WIRE-BAND-CUTTING IMPLEMENT.

Specification forming part of Letters Patent No. 190,467, dated May 8, 1877; application filed May 29, 1876.

*To all whom it may concern:*

Be it known that I, CHARLES H. CHADBOURN, of Rochester, in the State of Minnesota, have invented an Improvement in Band-Cutters, of which the following is a specification:

Grain is bound in bundles by a wire in many reaping and grain-binding machines, and hand-shears have been made for cutting such bands previous to the thrashing operation. These band-cutters have usually been either like a pair of shears or a hooked shear operated by both hands.

My band-cutter is adapted to use with one hand, and is available in lifting and handling the bundle of grain as well as in cutting the band.

Figure 1:
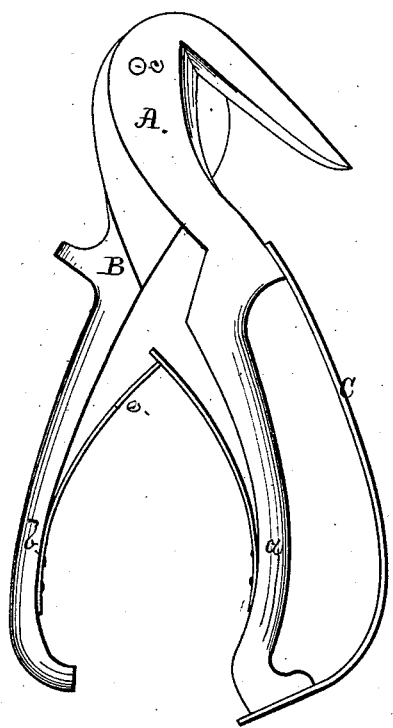
Figure 2:
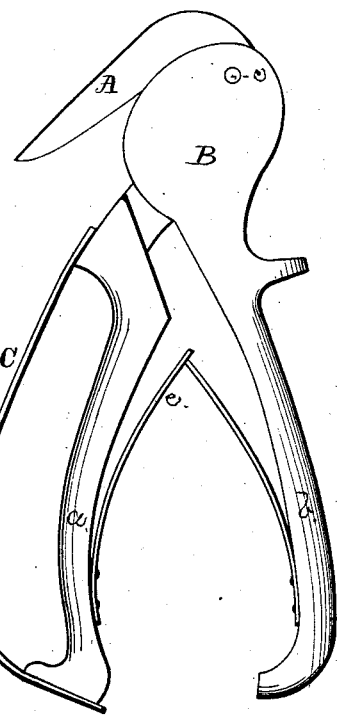

In the drawing, Figure 1 is an elevation at one side of the cutter, and Fig. 2 shows the other side of the implement.

The two handles $a\ b$ are pivoted together at $c$, and they are shaped somewhat like the handles of pliers or forceps, and there is a bow guard, C, preferably of leather, to one of the handles. The handle $a$ is continued as a hooked blade, A, that projects outwardly from near the pivot $c$, and there is an elliptical cutting-blade, B, adjacent to the pivot $c$, and made as part of the handle $b$.

It will now be seen that the handles $a\ b$ are easily grasped, and that by them the hook A can be availed of in catching and lifting a bundle of grain by the binding-wire thereof, and this binding-wire will draw down against the blade B, so that it can be instantly separated by closing the handles $a\ b$.

There are springs at $e$ that serve to open the handles.

I claim as my invention—

The wire-band-cutting implement, composed of the curved handles $a\ b$ pivoted at $c$, the hooked blade A upon the handle $a$, and the elliptical blade B upon the handle $b$, the parts being constructed substantially as and for the purposes set forth.

CHAS. H. CHADBOURN. [L. S.]

Witnesses:
C. H. BLISS,
T. H. McCONNELL.